United States Patent

[11] 3,632,463

[72] Inventor William McFarlane
 Murfreesboro, Tenn.
[21] Appl. No. 662,796
[22] Filed Aug. 23, 1967
[45] Patented Jan. 4, 1972
[73] Assignee Emerson Electric Co.

[54] APPARATUS FOR MAKING ELECTRIC RESISTANCE HEATING MATS
 9 Claims, 13 Drawing Figs.
[52] U.S. Cl. .................................. 425/113,
 156/376, 156/390, 156/498, 156/499, 156/500, 156/543
[51] Int. Cl. .................................. B29j 5/08
[50] Field of Search .................................. 156/374,
 376, 244, 498, 390, 500, 499, 543, 501, 434, 436, 439, 440, 322; 18/18; 118/315, 323, 324, 325

[56] References Cited
 UNITED STATES PATENTS

| | | | |
|---|---|---|---|
| 3,024,147 | 3/1962 | Brooks et al. | 156/244 X |
| 3,247,039 | 4/1966 | Schultheiss | 156/244 X |
| 3,249,666 | 5/1966 | French | 156/244 X |
| 3,321,357 | 5/1967 | Kennedy | 156/244 X |
| 3,322,610 | 5/1967 | Brooks et al. | 156/244 X |
| 3,384,530 | 5/1968 | Mercer et al. | 156/500 X |
| 3,445,319 | 5/1969 | Dawbarn | 156/244 X |
| 3,470,055 | 9/1969 | Wade | 156/500 X |
| 2,704,734 | 3/1955 | Draper et al. | 156/440 X |
| 2,828,795 | 4/1958 | Hartstein | 156/440 |
| 2,895,535 | 7/1959 | Ono | 156/434 X |
| 3,272,679 | 9/1966 | Hebberling | 156/440 |
| 3,459,615 | 8/1969 | Eilerman | 156/434 X |
| 3,507,736 | 4/1970 | Plymale | 156/500 X |
| 3,300,366 | 1/1967 | Krolik | 156/244 X |

*Primary Examiner*—Benjamin R. Padgett
*Assistant Examiner*—Stephen J. Lechert, Jr.
*Attorney*—Williams and Kreske ABSTRACT: Apparatus for making an electric heating mat comprising a support for portions of electric resistor wire which are in laterally spaced relation, and an extrusion head above the support and from which a strand of plastic material is extruded downwardly toward the wire, the support and extrusion head being relatively movable so that the downwardly extruded strand is laid crosswise of and over the wire portions and adheres thereto at the places of crossing to thereby form a dielectric strand connection between the wire portions.

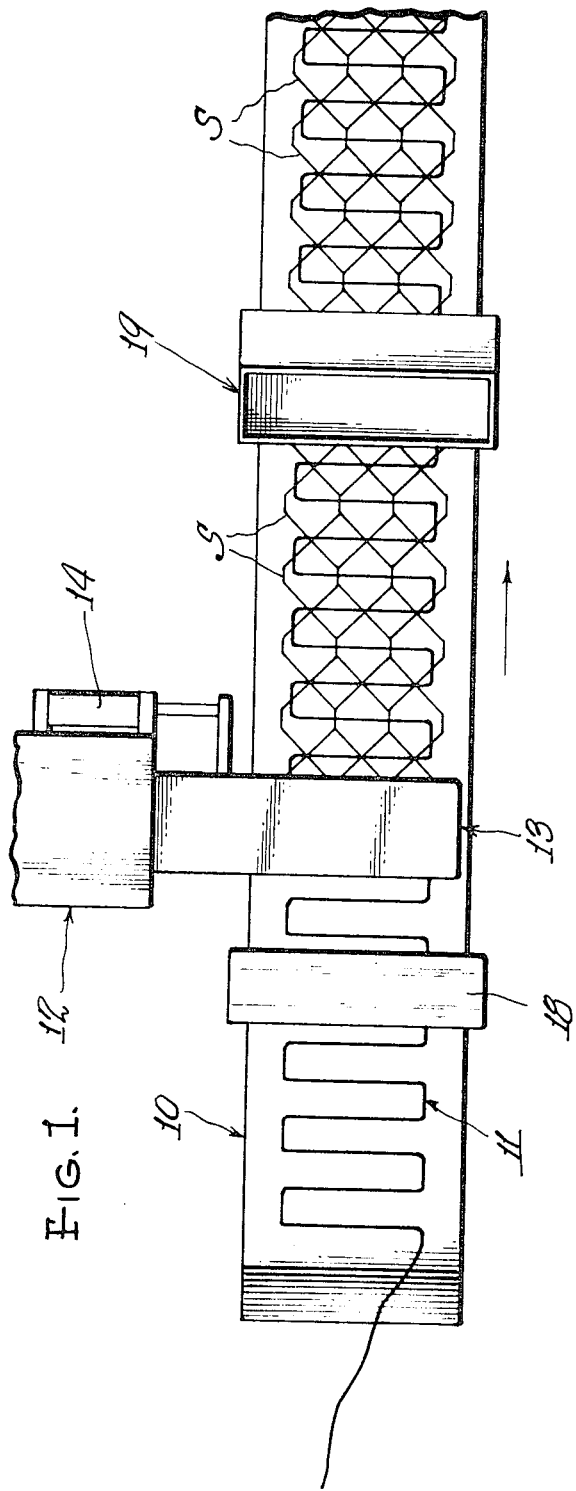
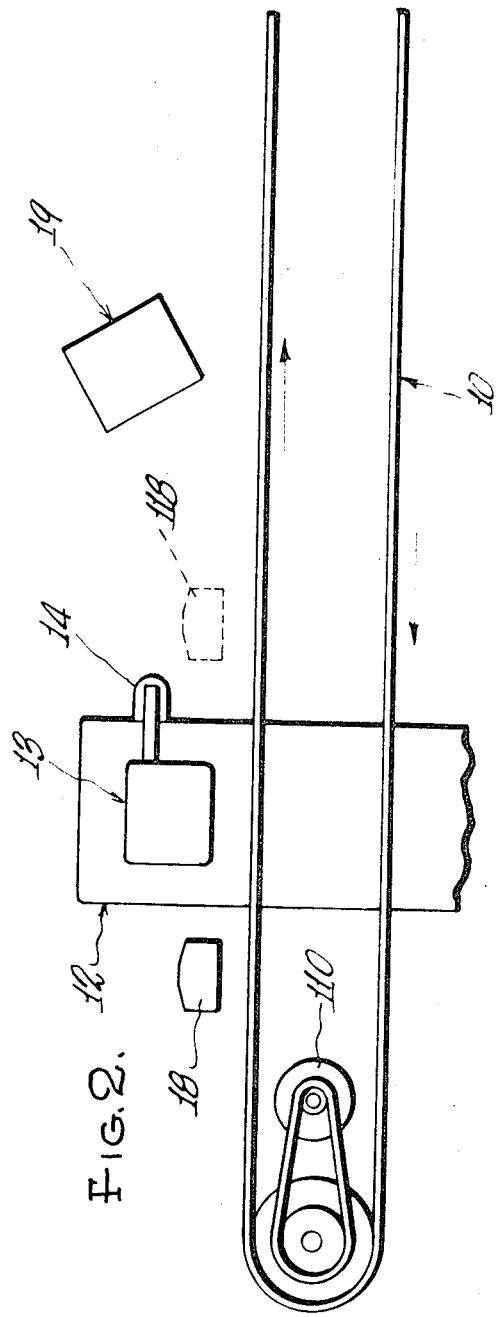
INVENTOR.
WILLIAM McFARLANE
BY
*Williams and Krack*
ATTORNEYS

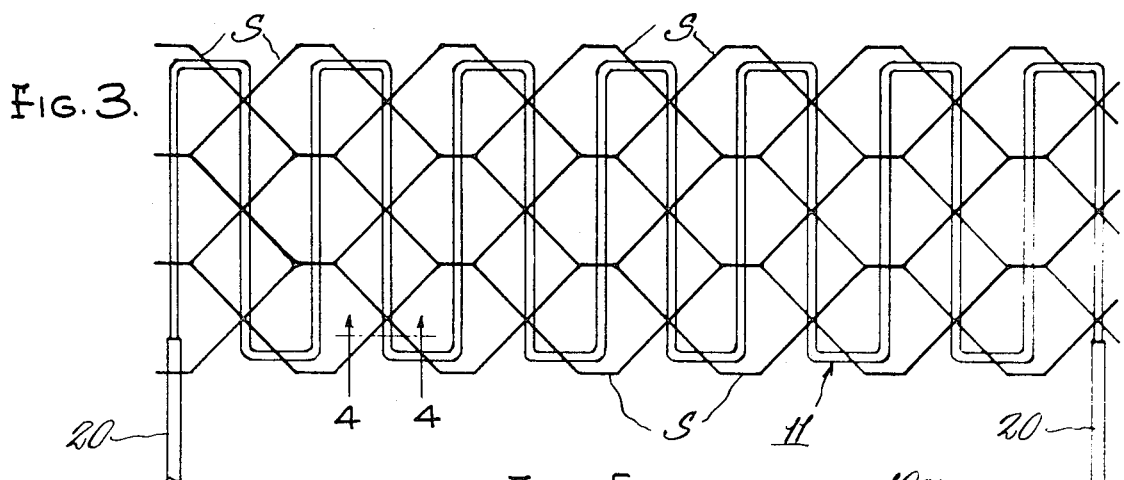
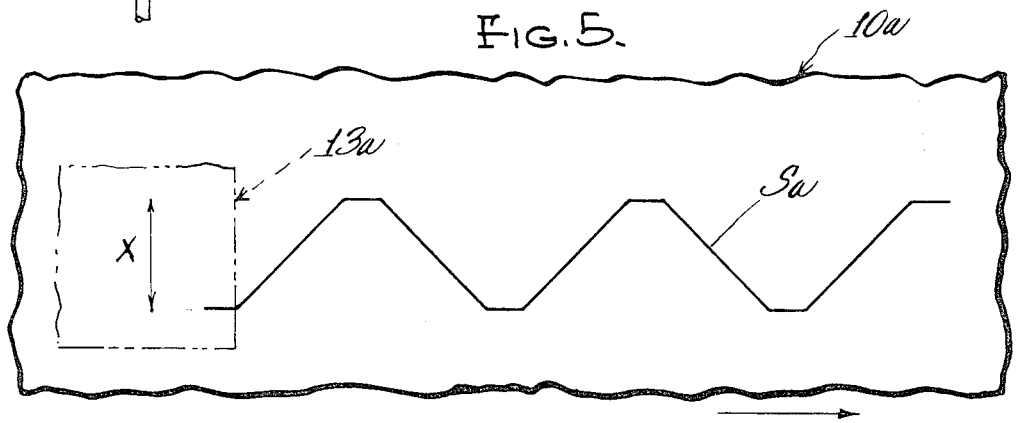
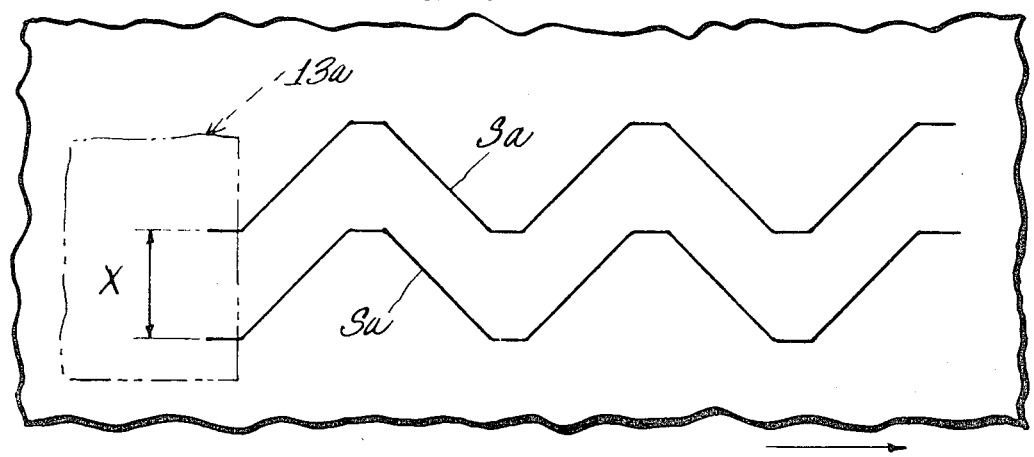
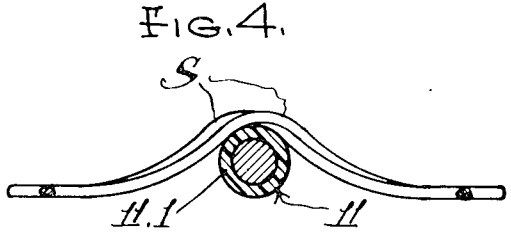

INVENTOR.
WILLIAM McFARLANE

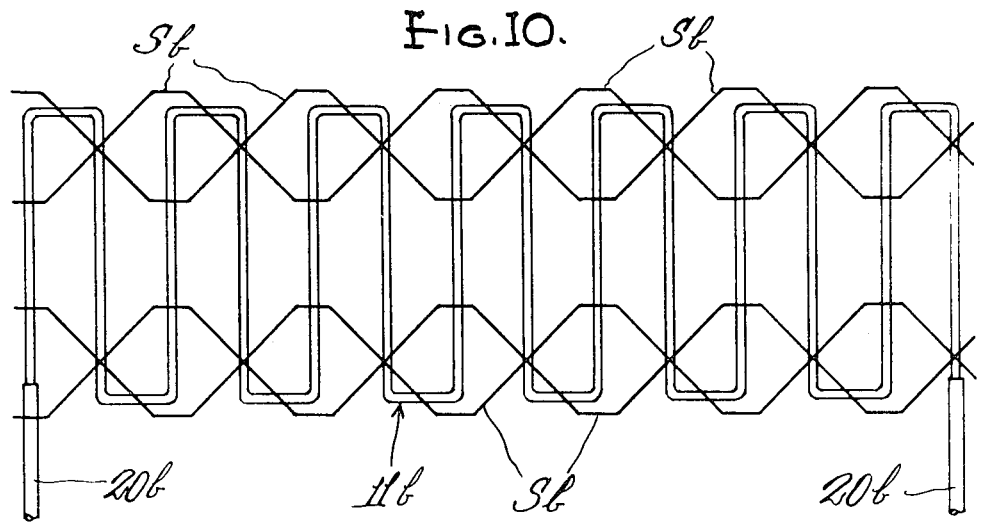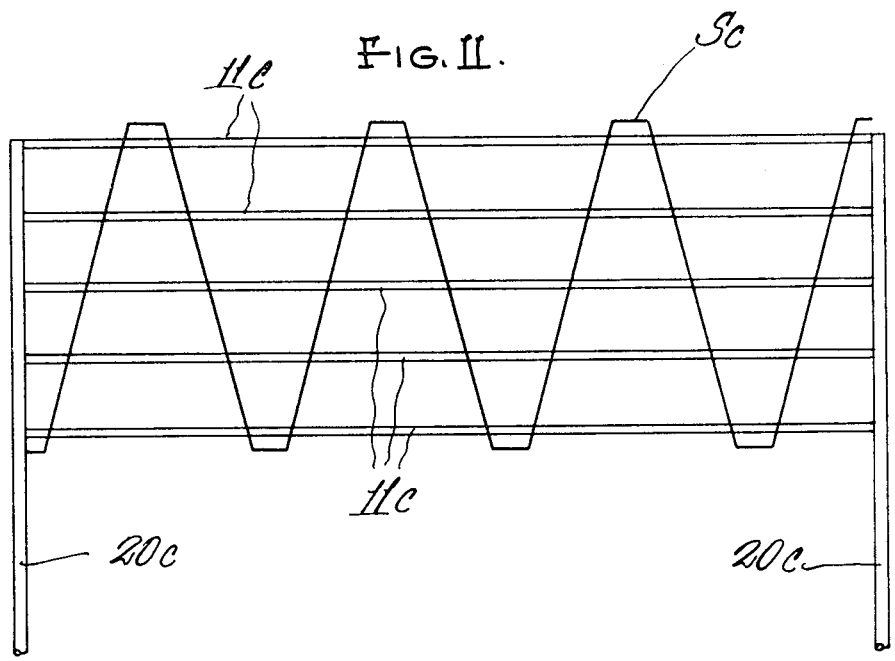

INVENTOR.
WILLIAM McFARLANE
BY
*Williams and Kreske*
ATTORNEYS

APPARATUS FOR MAKING ELECTRIC RESISTANCE HEATING MATS

Electric resistance heating mats of the type which can be embedded in concrete for snow melting, or embedded or otherwise attached to walls, ceilings or floors for heating a room, have long been known and used. Such mats have even been formed by disposing electric resistance wire portions in a predetermined pattern and retaining such wire portions in position with each other by means of thermoplastic strands extending across the wire portions and adhered thereto.

Prior art methods and apparatus for making electric heating mats of the type hereinabove described, however, were slow and costly whereas the present invention provides methods and apparatus which drastically increases speed of manufacture of electric heating mats while greatly reducing manufacturing costs thereof. These and other advantages will readily become apparent from a study of the following description and from the appended drawings.

OUTLINE OF DRAWINGS

In the drawings accompanying this specification and forming a part of this application there is shown, for purpose of illustration, an embodiment which the invention may assume, and in these drawings:

FIG. 1 is a generally diagrammatic, top plan view of apparatus embodying the present invention, FIG. 2 is a side elevational view of the apparatus seen in FIG. 1, FIG. 3 is an enlarged plan view of an electric resistance heater mat made in accordance with the present invention, FIG. 4 is an enlarged, sectional view generally corresponding to the line 4—4 of FIG. 3, FIG. 5 is a diagrammatic plan view showing the pattern in which a single strand of thermoplastic material is deposited on a moving conveyor by a reciprocating extrusion head, FIG. 6 is a view like FIG. 5 but showing the pattern in which two strands are deposited when the extrusion head apertures from which respective strands issue are spaced from each other in a direction from side to side of the direction of conveyor movement, FIG. 7 is a view like FIG. 6 but showing the pattern formed when respective head apertures are spaced from each other in the direction of conveyor movement, FIG. 8 is a view like FIG. 6 but showing the pattern formed when respective apertures are spaced from each other both in the direction of conveyor movement and in a direction from side to side of conveyor movement, FIG. 9 is a view similar to FIGS. 5–8 but showing the pattern formed when the extrusion head is formed with six apertures, arranged in two rows of three each, from which thermoplastic strands simultaneously issue, FIG. 10 is a view similar to FIG. 3 but showing the pattern in which the strands will be deposited when the center pair of extrusion head apertures seen in FIG. 9 are omitted, FIG. 11 is a view similar to FIG. 3 but with resistor wires arranged in a different pattern and with but a single thermoplastic strand extruded thereonto, FIG. 12 is a view similar to FIG. 3 but of a heater mat formed by a nonreciprocating extrusion head, and FIG. 13 is a view similar to FIG. 3 but of a double width heater mat formed of two resistor wires electrically interconnected in series relation.

DETAILED DESCRIPTION

Figure 7:
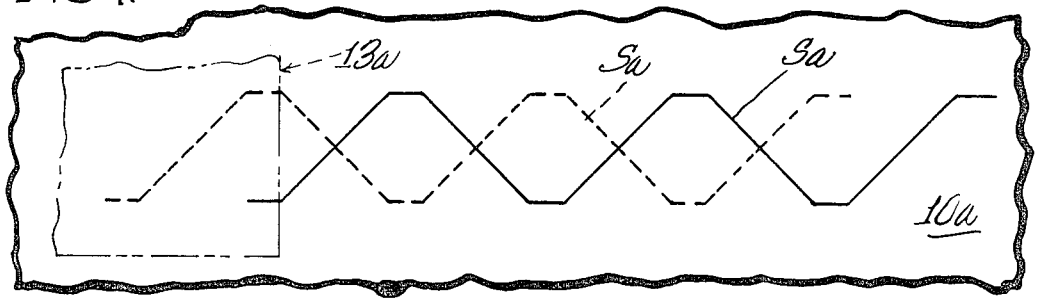

With reference to FIGS. 1 and 2, apparatus for the manufacture of electric heating mats of the type illustrated in FIG. 3 is generally diagrammatically shown. Such apparatus preferably comprises a conveyor 10 driven by a motor 110 and having an upper reach or other movable planar support adapted to receive an electric resistance heating wire 11 arranged in a predetermined pattern in which certain wire portions are disposed in spaced, side-by-side relation. In FIG. 1, the wire 11 is shown arranged in a sinuous pattern; however, other wire patterns may be employed as will later appear. Although not shown, the conveyor may carry pins or the like for temporarily maintaining the wire in the described pattern as it is moved by the conveyor from left to right in the position of parts illustrated.

Spaced from the left, or entry end of conveyor 10, is extruding apparatus 12 for thermoplastic material and having a head 13 spaced slightly above the upper reach of the conveyor. Head 13 of the extruder is adapted to be reciprocated in a path from side to side of the conveyor, as by means of a suitably controlled fluid cylinder 14, for a purpose to appear. Suitable orifice means of apertures, of a number and arrangement later to be disclosed, are formed in the underside of head 13 and a suitable thermoplastic material, such as low density polyethylene, is adapted to be heated to plastic state and extruded as thin strands or ribbons through the head apertures for deposit upon the underlying, upper reach of the conveyor and over the wire pattern disposed thereon.

To facilitate understanding of the function of the extrusion head in depositing strands of thermoplastic material on the wire pattern, attention is directed to FIGS. 5 through 9. In each of such figures, the upper reach of conveyor 10a will be assumed to be moving at a predetermined constant rate in a direction from left to right while the extrusion head 13a will be assumed to be reciprocated a predetermined amount in a direction from side to side of the conveyor at a constant rate and with a slight dwell intermediate its travel reversals.

Turning first to FIG. 5 and assuming the extrusion head 13a be provided with a single aperture through which thermoplastic material issues, a strand Sa will be deposited on the moving conveyor in the pattern shown if the head is reciprocated the amount indicated at X. Note that the elongated, angularly disposed strand portions are formed during traversing movement of the extrusion head while the short, interconnecting strand portions which are aligned with the direction of conveyor movement are formed while the extrusion head is momentarily immobilized between each reversal of direction of its traversing movement.

In the event the extrusion head is provided with two orifices or apertures from which thermoplastic material issues and assuming such apertures are spaced from each other the amount shown at X in the direction of head movement and in alignment therewith (see FIG. 6), a pair of strands Sa will be deposited in spaced, side-by-side relation in precise registry with each other. Note that in this instance, corresponding portions of respective strands are in parallel relation.

In FIG. 7, the extrusion head is still provided with two apertures; however, in this instance, the apertures are in alignment with the direction of conveyor movement and are spaced from each other an amount equal to one-half the longitudinal spacing between adjoining, corresponding peaks in the strand as deposited on the conveyor. For clarity of disclosure, the strand deposited by the aperture on the right side of the head is shown by solid line while the strand deposited by the aperture on the left of the head is shown by broken line. Note that with this arrangement of apertures, strands are deposited, one superimposed upon the other, but with the peaks formed by respective strands offset from each other longitudinally of the conveyor. Since the strands are quite plastic when first deposited on the conveyor, they will adhere to each other at their places of intersection.

Figure 8:
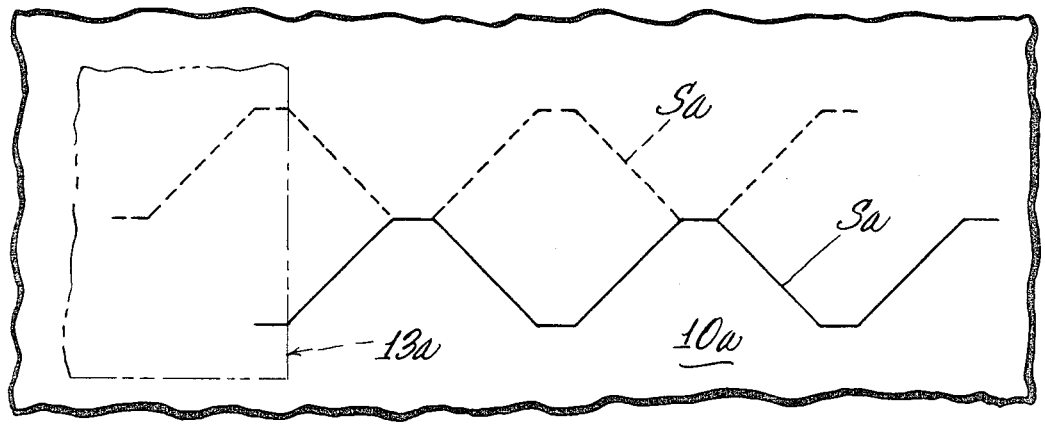

Turning to FIG. 8, if the head is still provided with two apertures but with such apertures spaced from each other both longitudinally of conveyor movement and transversely thereof; that is, an aperture spacing which is a combination of that shown in FIG. 6 and that shown in FIG. 7, the illustrated diamond-shaped configuration of thermoplastic strands will be deposited. Here again, the strand deposited by aperture on the right side of the head is shown by solid line while the other strand is shown by broken line. Also, as previously mentioned, the strands will adhere to each other at their places of intersection.

Figure 9:
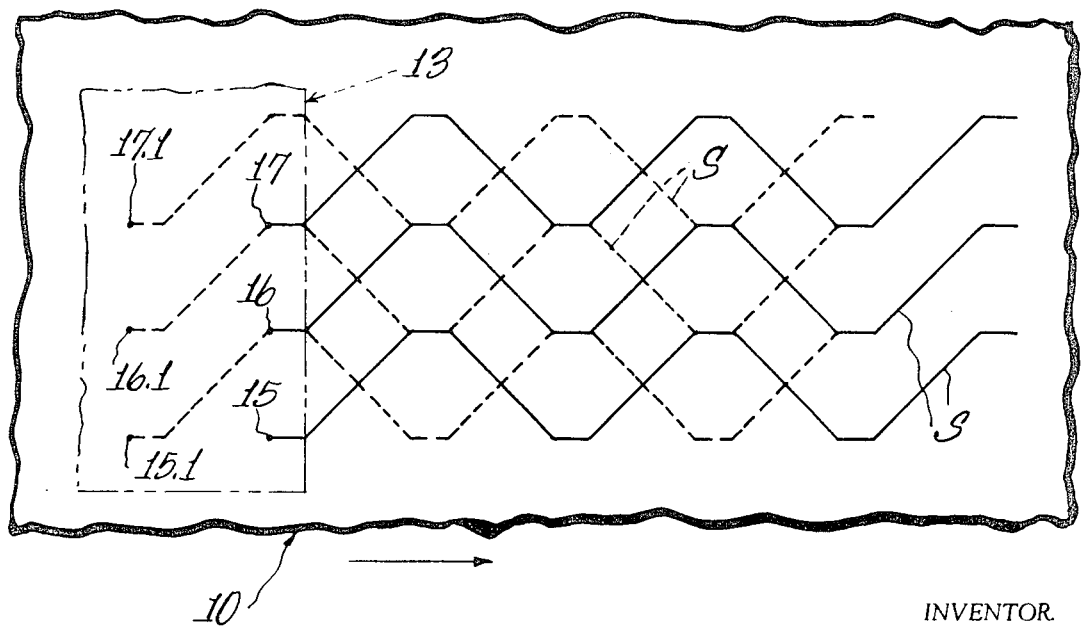

Bearing in mind the disclosures of FIGS. 5 through 8, head 13 is shown in phantom in FIG. 9 to be provided with pairs of apertures 15, 15.1; 16, 16.1, and 17, 17.1. The apertures of each aperture pair are aligned with but spaced from each other in the direction of conveyor movement, the aperture pairs are spaced from each other in a direction transverse to conveyor movement an amount equal to the amount of reciprocation of head 13, and the apertures 15, 16 and 17 are aligned with each other in the direction of head movement as are the apertures 15.1, 16.1 and 17.1. Upon movement of the conveyor 10 and reciprocation of the extrusion head 13 as shown and described, the full line strands S will be deposited upon the moving conveyor from the head apertures 15, 16 and 17 while the broken line strands will be deposited by the head apertures 15.1, 16.1 and 17.1. As previously mentioned, since the strands are in a heated, very plastic state when deposited on the conveyor, they will adhere to each other at their places of intersection and, when such strands cool and solidify, the illustrated mesh structure, having considerable strength, will be provided. From the foregoing it will be evident that if the strand pattern seen in FIG. 9 is deposited upon and adhered to a resistor wire, an integrated structure will be provided when the strands cool and solidify.

Returning to FIG. 1, a suitable electric resistor wire 11 will be placed upon the entry or left end of the conveyor 10 in, for example, the sinuous pattern shown. The resistor wire 10 will preferably be of the insulated type having a coating 11.1 (see FIG. 4) of the same thermoplastic material as that extruded from the head 13.

Disposed above the upper reach of the conveyor 10 ahead of the extrusion head 13 there is shown a radiant heater 18 (see also FIG. 2) adapted to heat the underlying resistor wire sufficiently that its insulating coating will become soft enough to ensure its adherence with the strands deposited by the extrusion head. While the use of a radiant heater has been shown, it will be understood that other expedients may be employed to ensure adherence between the heater wire and the extruded strands of thermoplastic material. As an example, electric current might be passed through the resistor wire to raise the temperature of its coating the requisite amount.

As the heated sinuous resistor wire 11 is carried by the conveyor 10 beneath the reciprocating extrusion head 13, the thermoplastic strands seen in FIG. 9 will be deposited thereon and adhered thereto. To facilitate cooling and solidification of the plastic strands and the wire coating, a fan unit or the like 19 may direct a cooling flow of air upon the upper reach of the conveyor and on the heater mat thus formed.

From the foregoing, it will be evident that the heater mat may be formed in any practical length desired and then cut transversely to provide a mat of the length desired. Thereafter, as seen in FIG. 3, suitable lead wires 20 may be connected to respective ends of the resistor wire to provide for connection of the latter into an electrical power circuit.

The embodiment of the invention seen in FIG. 10 is similar to that seen in FIG. 3; accordingly, similar parts are identified by the same reference characters but with the suffix "b" appended. Bearing in mind that the thermoplastic strands S seen in FIG. 3 are deposited by an extrusion head having the three pair of apertures seen in FIG. 9, the strands Sb are deposited by an extrusion head in which the central pair of apertures 16, 16.1 of FIG. 9 are omitted to thus omit from the mat the center row of diamonds previously formed by the strands deposited by such apertures.

As heretofore disclosed, the heating mat has been formed by moving a single resistor wire disposed in a sinuous pattern beneath a transversely reciprocating extrusion head having a plurality of apertures from which thermoplastic strands issue for deposit upon the resistor as it passes beneath the head. However, heating mats having other configurations may also be made.

With reference to FIG. 11 wherein corresponding parts are identified by the same reference characters as before but with the suffix "c" added, the resistor wire pattern is formed of a plurality of wires 11c in spaced, side-by-side relation. Such wires will extend longitudinally of the conveyor previously described and will be carried beneath the extrusion head as before. In this embodiment, however, the extrusion head will be provided with but a single aperture to extrude a single strand Sc of thermoplastic material on to the resistor wire pattern. The heater mat thus formed will be completed by securing lead wires 20c across the resistor wires thus connecting the latter together in parallel circuits.

Figure 12:
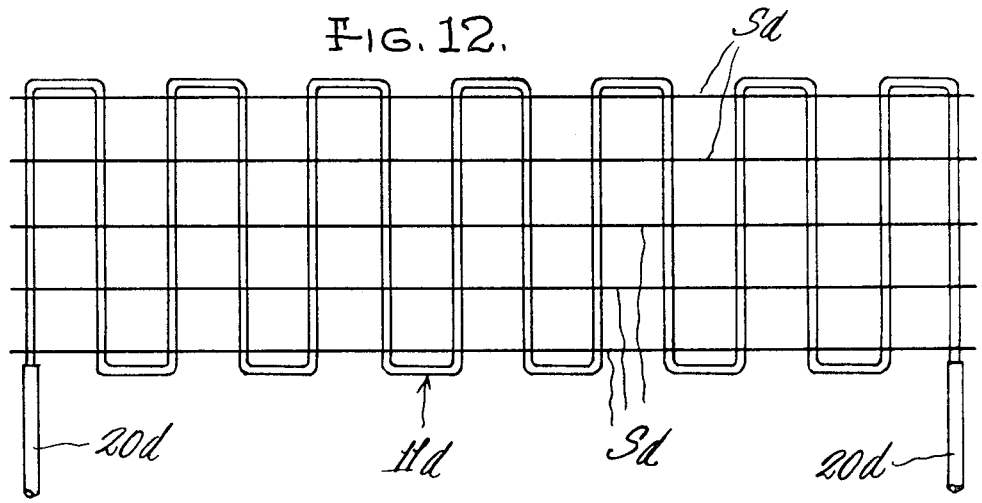

In the embodiment seen in FIG. 12 wherein corresponding parts are identified by the same reference characters as before but with the suffix "d" added, the resistor wire 11d has the same form as the resistor wire 11 in FIG. 3 and is moved beneath the extrusion head as previously described. In this embodiment, however, the extrusion head will be provided with five apertures in spaced-apart, transversely aligned relation to extrude respective strands Sd of thermoplastic material on the resistor wire pattern as it moves beneath the head. In this embodiment, the head is held stationary so that the strands Sd are deposited on the wire pattern in spaced, parallel relation. Ultimately, as before, the mat will be cut transversely to the desired length and lead wires 20d will be connected to respective resistor wire ends.

Figure 13:
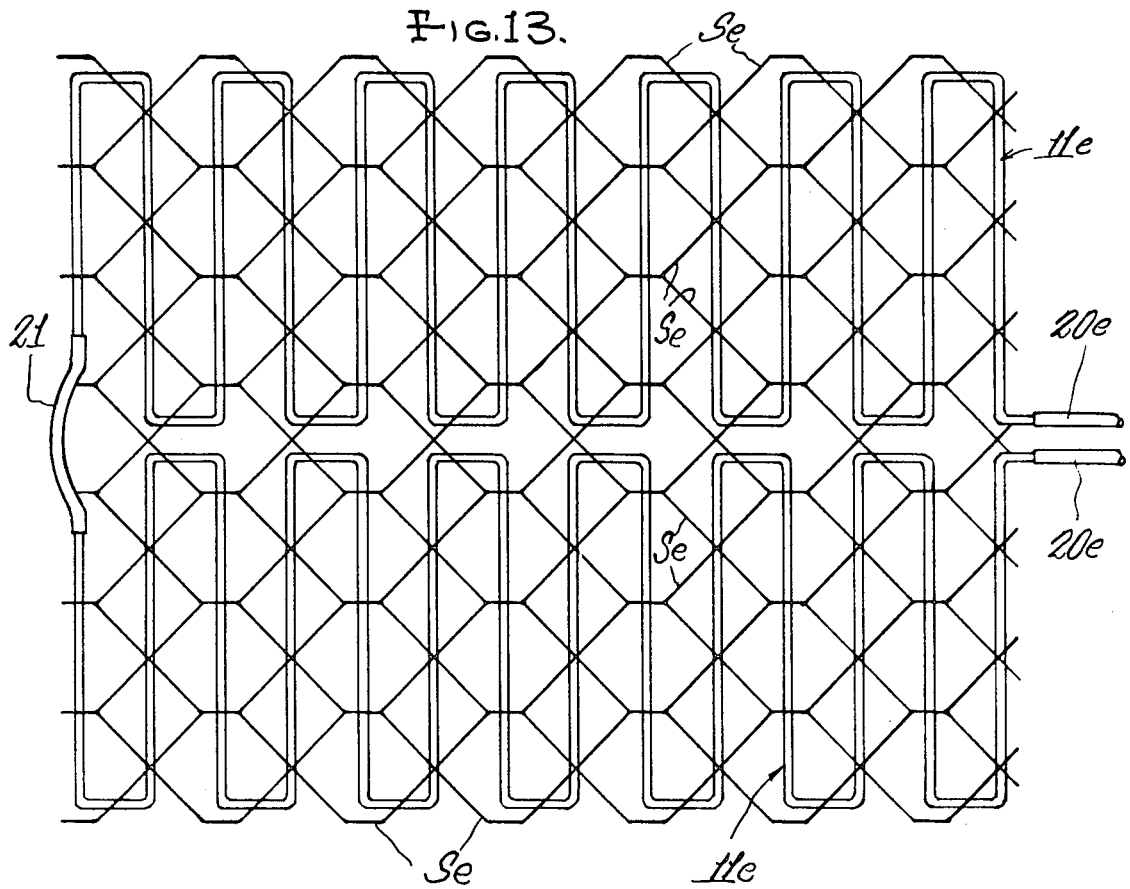

The embodiment of the invention seen in FIG. 13 is similar to that seen in FIG. 3 and corresponding parts are identified by the same reference characters but with the suffix "e" added. In this embodiment, a pair of resistor wires 11c are each arranged on the conveyor as previously described but in side-by-side relation. In the manufacture of such a mat, of course, the conveyor will be wide enough to accommodate the two resistor wires. The thermoplastic strands Se will be deposited on the resistor wire pattern by a reciprocating extrusion head as described with respect to FIG. 3; however, since the wire pattern of FIG. 13 is substantially twice as wide as that previously described, the extrusion head will be provided with six pairs of apertures rather than the three pairs earlier described.

With the mat thus formed cut to the desired length, adjoining resistor wire ends at one end may be joined by a connecting wire 21 while the leads 20e may be secured to the adjoining resistor wires at the other mat end. Thus, the resistor wires 11e are in series relation and the leads 20e are conveniently disposed in side-by-side relation.

While it presently appears that satisfactory adherence between the resistor wire and the thermoplastic strands will be effectuated merely by preheating the resistor wire as heretofore described, it may in some instances be desirable to apply additional heat after the strands are deposited upon the resistor wire. Accordingly and with reference to FIG. 2, this may easily be accomplished by providing a radiant heater 118 (similar to radiant heater 18) which heats the resistor wire and the overlying thermoplastic strands as they are carried beyond the extrusion head by the underlying conveyor.

In view of the foregoing it will be apparent to those skilled in the art that I have accomplished at least the principal object of may invention and it will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only and that my invention is not limited thereto.

I claim:

1. Apparatus for making an electric heating mat comprising:
   a substantially planar support mounted for movement along a first path, said support receiving thereon a length of electric resistance wire in a pattern of predetermined configuration,
   an extrusion apparatus having extruder head for thermoplastic material disposed in proximate overlying relation to said support and the wire pattern thereon,
   means mounting said head for cyclic translational movement in a second path angularly related to said first path, said head having orifice means on the underside thereof thereby to direct a continuous extruder heated thermoplastic ribbon downwardly on said support, and means, respectively, for moving said support in said first path and said extruder head in said second path, thereby to lay said thermoplastic ribbon onto and between reaches of said resistance wire for adherence thereto to form a patterned mat.

2. The mat-making apparatus of claim 1 further including a heater disposed adjacent said support upstream of the path of movement thereof for heating said wire prior to passage thereon on said support beneath said translating extruder head.

3. The mat-making apparatus of claim 1 wherein said movable support comprises an endless belt conveyor.

4. The mat-making apparatus of claim 2 further including means for cooling said wire and thermoplastic ribbon, said cooling means being disposed downstream of said extruder head.

5. The mat-making apparatus of claim 2 further including a second heater disposed adjacent said support downstream of the path of movement thereof.

6. The mat-making apparatus of claim 1 wherein said orifice means includes a plurality of orifices disposed in spaced relation to each other, thereby to deposit a plurality of thermoplastic ribbons onto and over said wire.

7. The mat-making apparatus of claim 5 wherein said orifices are spaced from each other in a direction along said first path of movement.

8. The mat-making apparatus of claim 5 wherein said orifices are spaced from each other in a direction along said second path of movement.

9. Apparatus for making an electric heating mat comprising:

a substantially planar support mounted for movement along a path, said support receiving thereon a length of electric resistance wire in a pattern of predetermined configuration, an extrusion apparatus having extruder head for thermoplastic material disposed in proximate overlying relation to said support and the wire pattern thereon, said head having orifice means on the underside thereof thereby to direct a continuous extruded heated thermoplastic ribbon downwardly onto said support, and means for moving said support in said path, and a heater disposed adjacent said support upstream of the path of movement thereof for heating said wire prior to passage thereof on said support beneath said extruder head.

* * * * *